Sept. 4, 1956

D. B. GOLDING 2,761,291

AIR DUCT FOR AUTOMOBILE COOLING SYSTEM

Filed June 9, 1954

2 Sheets-Sheet 1

INVENTOR.
DONALD B. GOLDING
BY
Wilson, Redrow and Gaines
ATTORNEYS.

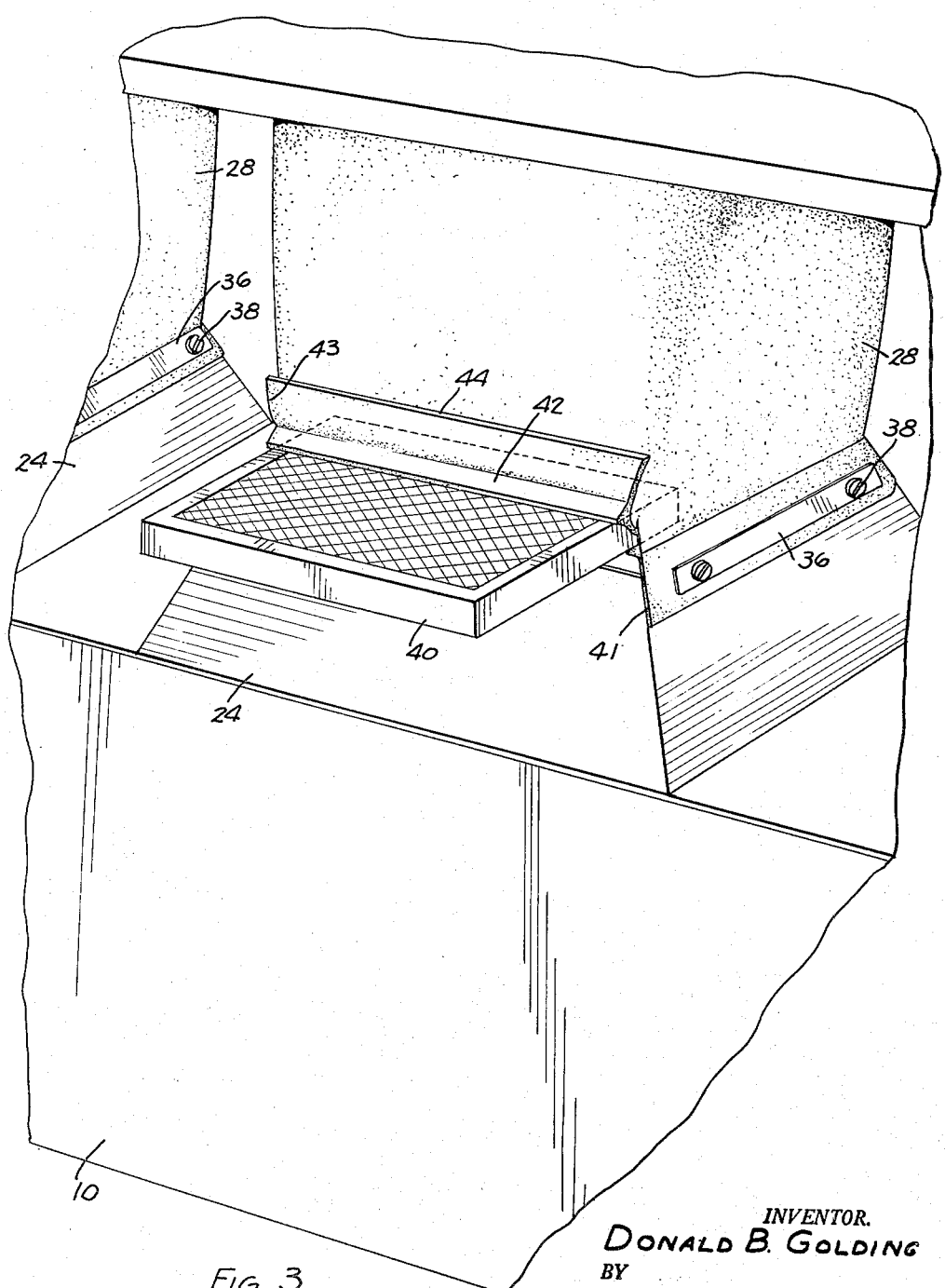

2,761,291
Patented Sept. 4, 1956

2,761,291
AIR DUCT FOR AUTOMOBILE COOLING SYSTEM

Donald B. Golding, Detroit, Mich., assignor to Studebaker-Packard Corporation, a corporation of Michigan Application June 9, 1954, Serial No. 435,528

3 Claims. (Cl. 62—117)

This invention relates to automotive air conditioning means, and more specifically, to improvements in air passageway ducts for such means.

It is common in automobiles having air refrigerating means, to place the cooling component of these systems in the trunk compartment thereof. The cooling means is usually encased in a chamber designed to effect circulation of the air to be cooled around the coils. Suitable inlet and outlet duct work is provided to conduct fresh air to the unit and the flow of air between the passenger compartment and the cooling unit. This invention pertains to an improved duct means for use in such a system that is designed to hold an air cleaning filter for the extraction of undesirable cigarette smoke, dust and other like matter which might be in the air being circulated.

It is therefore an object of this invention to provide a duct means for an air conditioning system or the like for use in automobiles having an integral internal means for holding an air-cleaning filter, said holding means taking the form of transverse raised rigids on the inner duct wall.

It is another object of this invention to provide an elastic duct structure, said duct being constructed and arranged to permit easy withdrawal and insertion of an air-cleaning filter.

Another object of this invention is to provide a flexible duct means having an easily accessible covering flap formed out of one side of the duct.

It is still a further object of this invention to provide in an automotive air-conditioning system a duct which will isolate noises, so as to prevent vibrations created in the cooling coil component from being transmitted to the passenger compartment.

Figure 1:
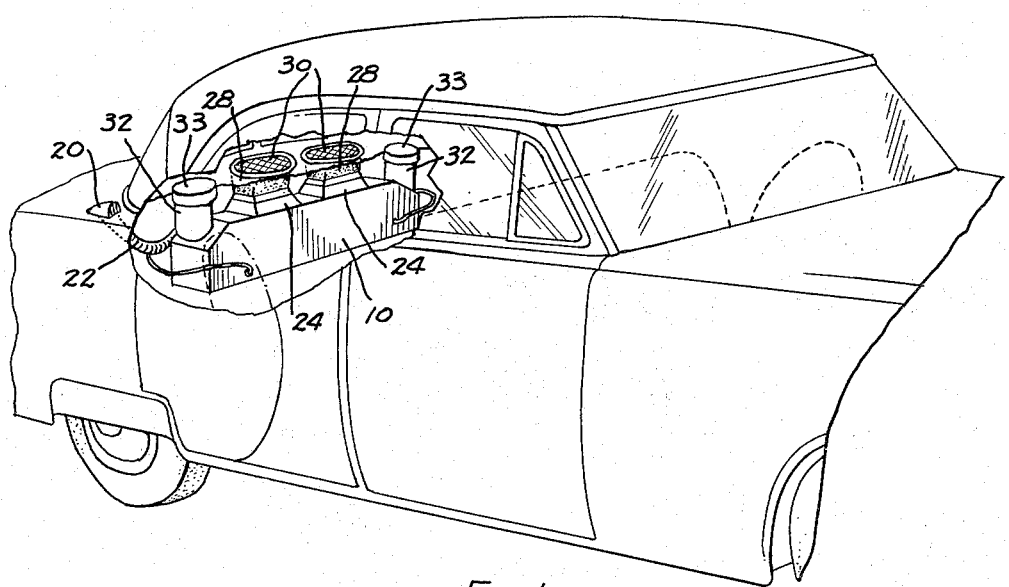
Figure 2:
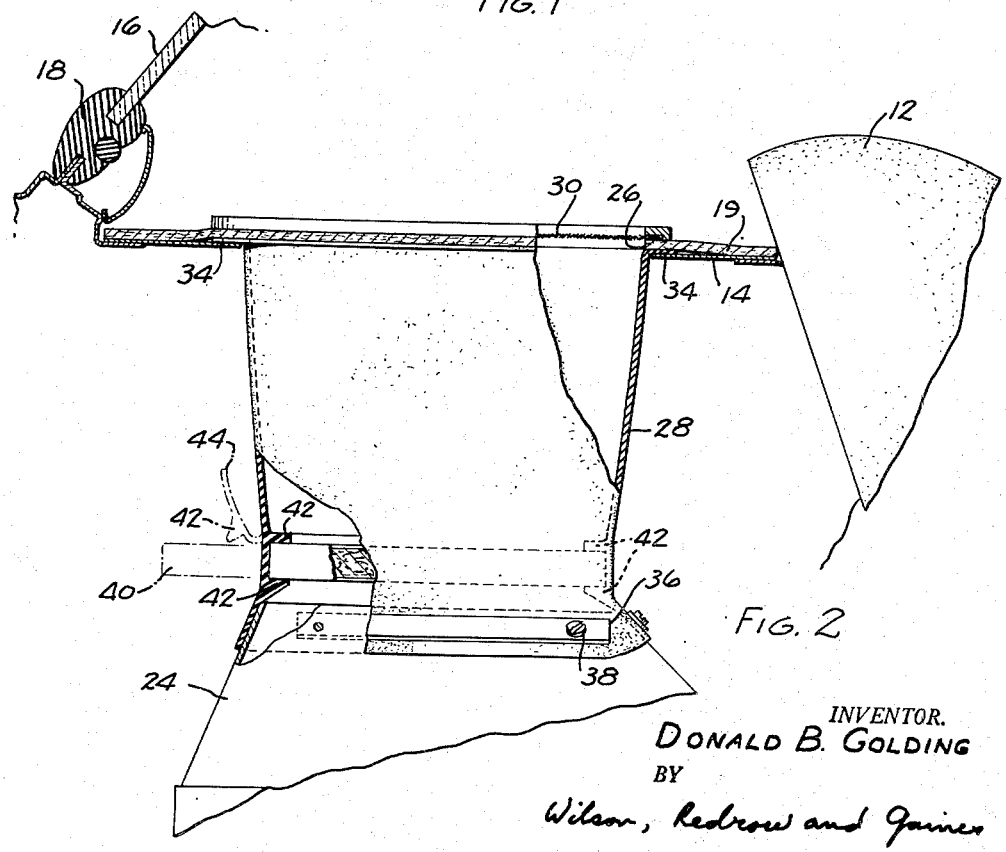

For a better understanding of these and other objects and the means by which they are obtained, reference is made to the following description, together with the drawings, in which:

Figure 1 is a perspective view of an automobile with a portion of the trunk cut away disclosing a cooling coil unit and related duct work;

Figure 2 is a side elevation, partly in section, of an elastic boot or duct forming the subject of this invention, the duct being shown as an inlet duct to the unit, the duct being connected between the rear package shelf and cooling unit; and Figure 3 is a perspective view looking from the rear end of the trunk compartment forwardly toward the unit installed in the front end thereof, showing one such elastic duct connected to the casing of the unit together with its flexible flap structure and associated air filter.

For a detailed description we start with Figure 1 which shows a portion of a conventional automobile cut away to disclose an air cooling unit located in its trunk compartment. This unit includes a casing 10 for the cooling coil component of the refrigerating or air conditioning system.

The casing 10 is secured to the floor of the trunk compartment directly behind the back rest 12 of the rear seat and under the package shelf 14, as shown in Figure 2.

The package shelf 14 lies between the rear seat back rest 12 and the rear window 16 and its molding 18, the shelf having a finishing layer 19 fitted thereto. The casing is preferably provided with four inlets and two outlets for controlling the flow of air over the cooling coils (not shown). Two of these inlets are connected to air scoops 20 provided on the outside shell of the automobile body to bring fresh outside air into the casing. As is well known, relative motion between the automobile and the outside air rams or forces the air into the scoops which are connected to ducts 22 leading into the casing inlets.

In addition to the fresh air supply, air in the passenger compartment is recirculated to the cooling unit through two other inlets 24. It is seen in Figure 3 that the two recirculating air inlets 24 are disposed on the top of the casing and take the shape of frustums of rectangular pyramids. The cooling unit is disposed in the trunk so that these inlets 24 are generally in line with two openings 26 in the package shelf 14.

The elastic duct or boot 28 which forms the subject of this invention, is adapted to be connected between each of the package shelf openings 26 and the cooling unit inlets 24, as will be described more fully below, to form inlet air passageways leading from the passenger compartment to the unit. As a protective measure, separate grilles 30 may be placed over each of these openings 26 where the ducts 28 open onto the shelf 14 which grilles 30 may be secured to the upper or outer surface of the shelf 14. Thus, it is seen that air in the passenger compartment can flow through the grilles 30 into the elastic ducts 28 and through the inlet 24 to the unit 10 for circulation around the cooling coils. A centrifugal blower (not shown) is located within the unit for the forced circulation of air through the unit and duct system.

Air then passes over the coils to be cooled in a well-known manner, before being delivered back to the passenger compartment for the comfort of the riders. This cooled air flows through appropriate outlet conduits 32 leading from the cooling unit to the passenger compartment. The outlet ducts 32 are connected between the outlets in the unit 10 and lead to suitable grille covered openings 33 in the package shelf 14.

In the preferred embodiment of this invention, each of the inlet ducts 28 is oval shaped where it joins the package shelf 14. The cross section of the duct 28 generates from an oval at this end to a rectangle having a smaller cross sectional area toward the other end and then flares rapidly outwardly to a similar rectangle having a larger cross sectional area. The flared bottom end on the elastic duct 28 is adapted to be fitted over and connected to the rectangular pyramid inlets 24 on the top of the cooling coil casing 10. The elastic duct 28 has an outwardly turned flange 34 formed integral therewith at its upper end, by which a flush connection is made to the package shelf 14. By securing the grille 30 in place with screws or similar fasteners this flanged end 34 of the duct 28 can be permanently located and it is preferably concealed by being positioned between the finish layer 19 and shelf 14. The flared bottom end on the elastic duct 28 may be secured to the pyramid shaped inlet by means of metallic strips 36 which may be screwed or bolted by means such as 38 that engage the duct to seal it to the casing 10.

A shoulder means is provided within the elastic duct for holding a generally rigid or self-sustaining air cleaner 40 therein. This means preferably takes the form of two spaced apart ridges 42 which are disposed transversely of the duct 28 around its internal wall. The air cleaner 40 may take the form of any conventional filter medium supported in a relatively rigid frame and the ridges are dimentionally designed so that their spacing will hold the frame snugly.

Two of the corner edges 41 and 43 of the flared bottom portion of the duct 28, preferably those facing toward the rear opening into the trunk of the car, are slit axially from one end at least as far up as the upper of the two spaced raised ridges 42, thus a flap 44 is formed out of that side of the elastic duct or boot 28. By removing the metal plate 36 which secures that flap 44 to the pyramidal inlet 24, the flap 44 is released from its attachment to the unit 10 and it may be peeled back to expose the butt end of the frame of the air cleaning filter 40 whereby the filter may be withdrawn by sliding it out from between its supporting ridges 42.

The purpose for withdrawing the filter 40 is to either replace it or to clean it. When returning the filter 40 to duty it is merely necessary to lift the flap 44 as explained above and insert the filter between the ridges 42, pushing it all the way in. Then the flap 44 may be secured with the metal strips 36 and fasteners 38. Obviously other fastening means may be used without deviating from this invention. With the flap position toward the rear of the automobile, access to the duct 28 to perform this operation may be had by lifting the rear deck lid.

It is thus seen that the duct just described has a dual purpose of being an air passageway and being a filter holder. Further advantages are that the filter may be withdrawn and inserted with extreme ease in a structure having the fewest number of parts. An inherent advantage in this design is that any vibration or noises created in the cooling coil box will not be transmitted to the passenger compartment because of the natural dampening effect of the elastic material used in the manufacture of the duct.

It is to be understood that the invention herein disclosed is not limited to the specific details of construction as shown in the drawings or described above. They are intended to present the preferred embodiment of the invention and not as limitations thereof. Modifications which occur to the man skilled in the art may be within the invention claimed. By way of illustration, this invention would be adaptable to cylindrical ducts as well as those having rectangular or other cross sectional shapes, also by the use of one axial slit, instead of two, adjacent flaps would be formed which could be peeled away for the insertion and withdrawal of the filter.

I claim:

1. An automobile having a trunk opening toward the rear thereof, an air circulating system having a cooling unit disposed in the trunk, said system including an elastic duct means, said duct means having internal shoulder means for holding a self sustaining air filter, said internal shoulder means taking the form of spaced apart raised ridges positioned generally transversely to direction of flow in said duct, and said duct being split at its rear axially from one end along two spaced lines at least to said ridges to form a flap out of a portion of one wall of said duct so that said flap may be peeled back by reaching through the rear of the trunk to provide a construction adapted for the insertion and withdrawal of said filter between said ridges.

2. In an automobile having a trunk opening toward the rear thereof, an air circulating system, said system including a cooling coil component disposed in the trunk, a casing for said cooling coil, air inlet means on said casing for directing the flow of air over said cooling coil, elastic duct means connected to the air inlet means, said duct means having a rectangular cross sectioned portion, said duct having internal shoulder means for holding a self-sustaining air filter, said internal means taking the form of spaced apart raised ridges positioned at said rectangular portion and positioned generally transversely to direction of flow in said duct means, said ridges being integral with the inner wall of said duct means, and said duct means being each split axially from one end along the two lines at least to said shoulder means to form a flap out of one side of each of said duct means so that said flap may be peeled back by reaching through the rear of the trunk to provide a construction adapted for the insertion and withdrawal of said filter between said ridges.

3. An automobile having a trunk opening toward the rear of the car, a rear seat cushion and a package shelf behind said cushion enclosing the front end of said trunk, an air cooling system in said trunk, said system including a cooling coil component, a casing for said cooling coil, said encased coil being located in the trunk behind said rear seat and under said package shelf, said casing being secured to the automobile body, a raised air inlet means on top of said casing cooperating with passages in the casing for directing flow of air over said cooling coil, said shelf having an opening therein, an elastic duct connecting said opening in the package shelf and said air inlet means, said duct having a rectangular cross sectioned portion, and said duct having transverse internal shoulder means at said rectangular portion for holding a self sustaining air cleaning filter, said shoulder means being integral with the inner wall of said duct, and said duct being split axially thereof from one end at least to said shoulder means at said rectangular portion along two lines at the rear thereof to form a flap out of one side of said duct so that said flap may be peeled back to provide a construction adapted for the insertion and withdrawal of a filter from the rear trunk opening.

References Cited in the file of this patent

UNITED STATES PATENTS

| | | |
|---|---|---|
| 2,162,439 | Lintern et al. | June 13, 1939 |
| 2,180,760 | Mayo | Nov. 21, 1939 |
| 2,289,910 | Hanson | July 14, 1942 |
| 2,294,036 | Kettering | Aug. 25, 1942 |
| 2,537,278 | Patterson | Jan. 9, 1951 |
| 2,655,091 | Geiger | Oct. 13, 1953 |
| 2,731,104 | Baker et al. | Jan. 17, 1956 |